United States Patent

Konrad et al.

[11] Patent Number: 5,153,426
[45] Date of Patent: Oct. 6, 1992

[54] RADIATION METER FOR RADIATION EMERGING FROM AN OPTICAL FIBER WITH A DIFFUSELY REFLECTING BODY AND CAVITY

[75] Inventors: Michael Konrad; Mandred Eichenlaub, both of München, Fed. Rep. of Germany

[73] Assignee: Messerschmitt-Bolkow-Blohm GmbH, Fed. Rep. of Germany

[21] Appl. No.: 745,755

[22] Filed: Aug. 16, 1991

[30] Foreign Application Priority Data

Sep. 19, 1990 [DE] Fed. Rep. of Germany ....... 4029637

[51] Int. Cl.⁵ .............................. H01J 5/16; G01J 1/00
[52] U.S. Cl. .................. 250/227.24; 250/228; 606/11
[58] Field of Search ............. 250/228, 227.24, 227.11, 250/216; 606/11, 12, 14, 16, 18; 356/236, 73.1

[56] References Cited

U.S. PATENT DOCUMENTS 4,395,126  7/1983  Kramer ............................ 250/228
4,564,012  1/1986  Shimada et al. ................. 606/12
4,722,337  2/1988  Losch et al. ..................... 606/16
4,892,409  1/1990  Smith ............................... 356/236

FOREIGN PATENT DOCUMENTS 2832847  2/1980  Fed. Rep. of Germany ........ 606/11
0032152  2/1989  Japan ................................. 356/236

Primary Examiner—David C. Nelms
Assistant Examiner—Michael Messinger
Attorney, Agent, or Firm—Evenson, Wands, Edwards, Lenahan & McKeown

[57] ABSTRACT

A radiation meter for radiation emerging from an optical fiber, comprising a hollow body having diffusely reflecting interior walls into which the end of the optical fiber can be introduced, and at least one detector arranged behind an opening of the hollow body. Between the end of the optical fiber and the opening for the detector, a diffusely reflecting body is arranged which, together with the interior wall of the hollow body, in the area of the opening for the detector, forms a gap with an adjustable gap thickness.

8 Claims, 1 Drawing Sheet

RADIATION METER FOR RADIATION EMERGING FROM AN OPTICAL FIBER WITH A DIFFUSELY REFLECTING BODY AND CAVITY

BACKGROUND AND SUMMARY OF THE INVENTION

The invention relates to a an apparatus for measuring radiation emerging from an optical fiber, comprising a hollow body surrounded by diffusely reflecting walls into which the end of the optical fiber can be introduced, and at least one detector arranged behind an opening of the hollow body.

German Patent Document DE 29 50 124 C2 discloses a so-called power meter for high energy lasers, in which the end of an optical fiber is slid into the opening of a chamber with at least partially diffusely reflecting walls. The light which emerges from the optical fiber is focussed by means of a lens, and impinges first on a diffusely reflecting plate and, after further reflections, through openings in the plate, onto detectors disposed behind them. Between the openings in the diffusely reflecting plate and the detectors, a filter plate is arranged for the reduction of the radiation passing through.

Despite its symmetrical construction, it was found that this arrangement is relatively sensitive to changes in the entry angle of the radiation and the radiating characteristics of the optical fiber. The selection of the filter disk and its surface quality also present problems.

It is therefore an object of the present invention to provide a radiation meter of the above-mentioned generic type which is less sensitive to changes in the entry angle of the radiation and to the radiating characteristics of the optical fiber, and which can be manufactured at lower cost due to the fact that optical elements, such as lenses or filters are not required.

These and other objects and advantages are achieved according to the invention by applying the principle of the Ulbricht sphere, in which, in contrast to known apparatus (such as the German Patent Document DE OS 24 17 399), no optical elements, such as filters or lenses are used for coupling and reduction of the light. The device according to the invention has the additional advantage that it can easily be adjusted to different radiation intensity ranges without the changing filters or detectors.

Other objects, advantages and novel features of the present invention will become apparent from the following detailed description of the invention when considered in conjunction with the accompanying drawings.

BRIEF DESCRIPTION OF THE DRAWING

The figure is a partially schematic cross sectional view of a radiation measuring apparatus according to the invention.

DETAILED DESCRIPTION OF THE DRAWING

Figure 1:
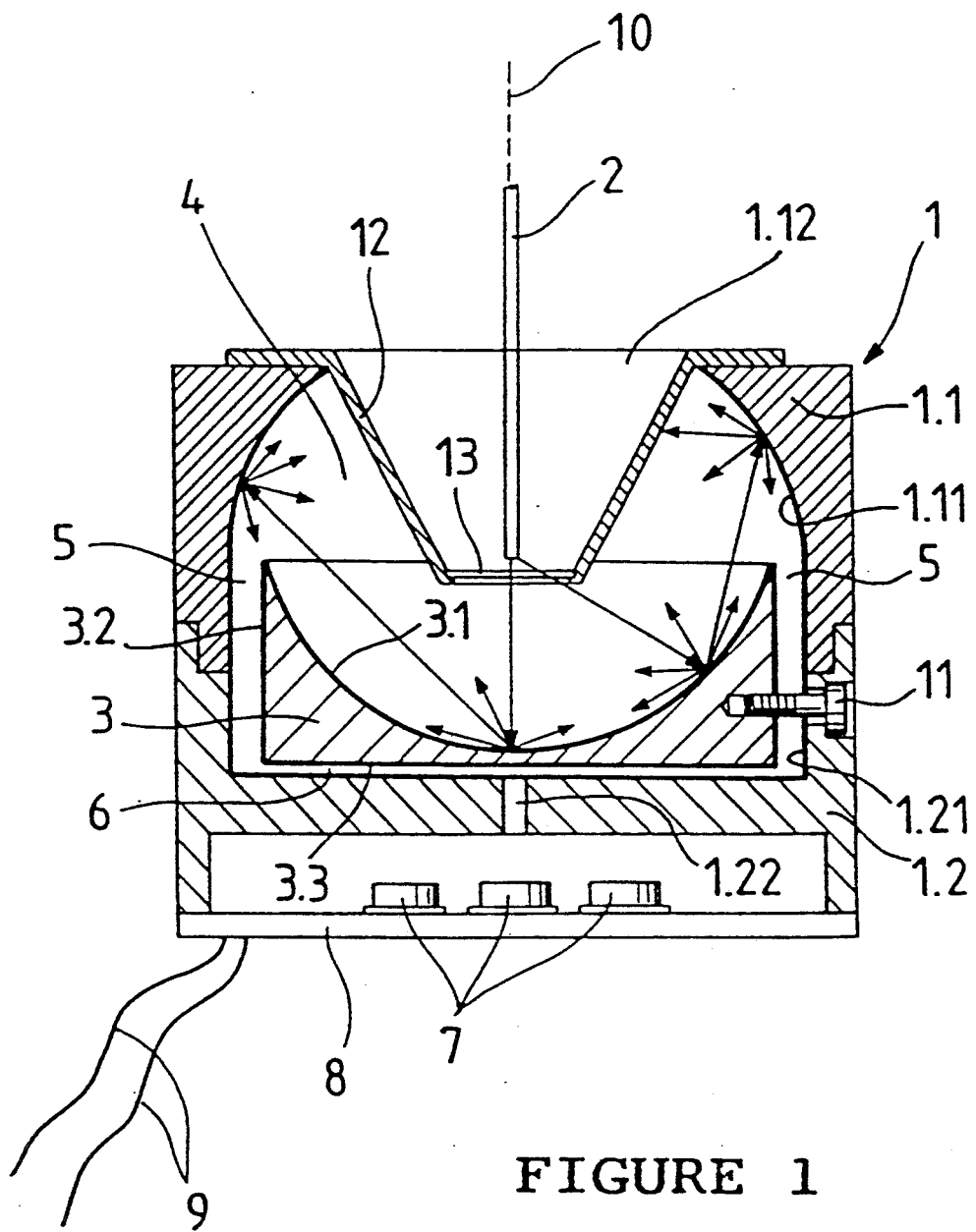

Referring to FIG. 1, the radiation meter has a two-part housing 1, one portion 1.1 of which has a semispherical interior wall 1.11 which is coated with a diffusely reflecting material, such as aluminum oxide. The other portion 1.2 of the housing 1 is constructed essentially as a cylindrical pot, the interior wall 1.21 of which is also diffusely reflecting and is seamlessly connected to the interior wall 1.11 of the housing part 1.1.

The hollow space enclosed by the housing parts 1.1 and 1.2, is rotationally symmetrical with respect to the axis 10. The housing part 1.1 as well as the part 1.2 have openings 1.12 and 1.22 around the axis of symmetry 10. An optical fiber 2 is guided through the relatively wide opening 1.12 so that the radiation to be measured emerges from the end of the optical fiber 2 into the hollow space. Behind the relatively narrow opening 1.22, detectors 7 are disposed on a holding device 8 which is hermetically sealed within the housing part 1.2. The electric signals of these detectors 7 are guided by way of lines 9 to a signal analysis device which is not shown.

In the hollow space formed by the housing parts 1.1 and 1.2 is a body 3 which has an outer shape similar to that of the interior wall of the housing part 1.2 and which forms with it an annular gap 5 as well as a planar gap 6 which extends circularly around the outlet opening 1.22. The opposite side 3.1 of the body 3, which faces the optical fiber 2, has a concave surface, in the shape, for example, of a hollow sphere or an ellipsoid. Together with the opposite interior wall 1.11 of the housing, this concave side 3.1 partly forms an interior space in the shape of a hollow sphere or an ellipsoid. The surfaces 3.1, 3.2 and 3.3 of the body 3 are also coated to be diffusely reflecting. For precise adjustment of the position of body 3, and thus the gaps 5 and 6, the body 3 is fastened to three eccentric screws, by means of which it is brought into a position which is symmetrical to the axis 10 and by which the gap 6 can be adjusted with respect to its parallelism and gap width. Depending on the radiation to be measured, the gap width, for example, for medical lasers, is 2-3 mm.

The light emerging by way of the optical fiber 2 first impinges on the concave side 3.1 of the body 3 and is diffusely reflected there. A small part of this reflected light is reflected again on the wall 1.11, either directly or by way of further multiple reflections, and arrives in the annular gap 5 and from there, by way of multiple reflections in the gap 6, concentrically from all sides, in the area of the opening 1.22. The light, which emerges there, is attenuated to such an extent that without additional filters it can be received by one of the detectors 7 disposed underneath. Because of the rotationally symmetrical arrangement of the hollow space, of the annular gap 5 as well as of the gap 6, the light emerging from the opening 1.22 is largely independent of the entry angle or of the radiating characteristics of the optical fiber 2.

For medical applications, it is necessary that the hollow space enclosed by the housing 1 be closed off with respect to the 25 optical fiber 2 in a sterile manner. For this purpose, a funnel-shaped insert 12 of a diffusely scattering material, such as teflon, is inserted into the opening 1.12. The funnel-shaped insert 12 projects approximately to the center of the hollow space enclosed by the housing 1, and carries a plate 13 which is transparent for the radiation to be measured.

For the measurement of the radiation intensity of the light emerging from the optical fiber 2, the optical fiber is simply inserted into the opening of the funnel in front of the plate 13. Because of the insensitivity of the arrangement with respect to the entry angle and the radiating characteristics of the optical fiber, the measuring result can be reproduced up to a few percentage points.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for measuring radiation emerging from an optical fiber, comprising:
    a hollow body having an interior cavity with diffusely reflecting interior walls, said hollow body having an aperture into which an end of an optical fiber can be introduced into said cavity, and an opening from which reflected radiation can escape from said cavity;
    at least one detector positioned to receive and detect radiation from said opening; and
    a diffusely reflecting body arranged within said cavity between said aperture and said opening, said body being positioned so as to define an adjustable gap between said body and said interior walls.

2. Apparatus according to claim 1, wherein the diffusely reflecting body has a concave surface on a side facing the optical fiber.

3. Apparatus according to claim 1, wherein the diffusely reflecting body is arranged symmetrically with respect to the opening for the detector and forms a rotationally symmetrical gap around it.

4. Apparatus according to claim 2, wherein the diffusely reflecting body is arranged symmetrically with respect to the opening for the detector and forms a rotationally symmetrical gap around it.

5. Apparatus according to claim 1, wherein the hollow body is rotationally symmetrical about an axis of symmetry, which passes through a center of said aperture and a center of said opening, and wherein said diffusely reflecting body is also arranged symmetrically with respect to said axis of symmetry.

6. Apparatus according to claim 2, wherein the hollow body is rotationally symmetrical about an axis of symmetry, which passes through a center of said aperture and a center of said opening, and wherein said diffusely reflecting body is also arranged symmetrically with respect to said axis of symmetry.

7. Apparatus according to claim 3, wherein the hollow body is rotationally symmetrical about an axis of symmetry, which passes through a center of said aperture and a center of said opening, and wherein said diffusely reflecting body is also arranged symmetrically with respect to said axis of symmetry.

8. Apparatus according to claim 4, wherein the hollow body is rotationally symmetrical about an axis of symmetry, which passes through a center of said aperture and a center of said opening, and wherein said diffusely reflecting body is also arranged symmetrically with respect to said axis of symmetry.

* * * * *